US008083821B2

(12) United States Patent
Tempelman et al.

(10) Patent No.: US 8,083,821 B2
(45) Date of Patent: Dec. 27, 2011

(54) SYSTEM FOR MODIFYING THE ATMOSPHERE WITHIN AN ENCLOSED SPACE AND INCUBATOR SYSTEM INCLUDING THE SAME

(75) Inventors: Linda A. Tempelman, Lincoln, MA (US); Monjid Hamdan, Worcester, MA (US); Matthew P. Steinbroner, Grafton, MA (US)

(73) Assignee: Giner, Inc., Newton, MA (US)

( * ) Notice: Subject to any disclaimer, the term of this patent is extended or adjusted under 35 U.S.C. 154(b) by 445 days.

(21) Appl. No.: 12/082,975

(22) Filed: Apr. 14, 2008

(65) Prior Publication Data

US 2008/0282653 A1    Nov. 20, 2008

Related U.S. Application Data

(60) Provisional application No. 60/923,296, filed on Apr. 13, 2007.

(51) Int. Cl.
*H01M 8/18* (2006.01)
(52) U.S. Cl. ............ 55/385.2; 236/3; 204/400; 204/401; 204/451; 204/601; 204/157.5; 205/775; 205/791.5
(58) Field of Classification Search ............... 55/385.1; 435/3; 236/3; 204/400, 401, 451, 601; 205/775, 205/791.5; 429/2, 12, 13, 21, 34, 514
See application file for complete search history.

(56) References Cited

U.S. PATENT DOCUMENTS

| 4,336,329 | A | * | 6/1982 | Hesse et al. ..................... 435/3 |
| 5,090,617 | A | * | 2/1992 | Swan et al. ..................... 236/3 |
| 5,262,034 | A | * | 11/1993 | Kunz et al. ..................... 205/775 |
| 5,669,176 | A | | 9/1997 | Miller |
| 6,179,986 | B1 | | 1/2001 | Swette et al. |
| 6,368,592 | B1 | | 4/2002 | Colton et al. |
| 2005/0284762 | A1 | * | 12/2005 | Astorga-Wells et al. ..... 204/451 |
| 2007/0281200 | A1 | * | 12/2007 | Tanaka et al. ................. 429/34 |
| 2008/0248350 | A1 | * | 10/2008 | Little et al. ..................... 429/21 |
| 2008/0261083 | A1 | * | 10/2008 | Rinzler et al. .................. 429/2 |
| 2009/0220388 | A1 | * | 9/2009 | Monzyk et al. ............... 422/121 |
| 2010/0003547 | A1 | * | 1/2010 | Chen et al. ..................... 429/13 |
| 2010/0180889 | A1 | * | 7/2010 | Monzyk et al. .......... 128/202.26 |
| 2011/0008713 | A1 | * | 1/2011 | Markoski et al. ............. 429/514 |

FOREIGN PATENT DOCUMENTS

WO    WO 96/35944    * 11/1996 .................... 204/451

* cited by examiner

*Primary Examiner* — Duane Smith
*Assistant Examiner* — Minh-Chau Pham
(74) *Attorney, Agent, or Firm* — Kriegsman & Kriegsman (57) ABSTRACT

System for modifying the chemical composition of atmosphere within an enclosed space and incubator system including such a system. The concentration of oxygen within the enclosed space may be either increased or decreased using an electrochemical device. The concentration of carbon dioxide within the enclosed space may be increased using an electrochemical or chemical device. As necessary, purging of the system with ambient air can be a part of the process of controlling the chemical composition of the atmosphere. The present invention obviates the need to use pressurized gas cylinders to supply atmospheric gases to the enclosed space.

24 Claims, 6 Drawing Sheets

FIG. 1

Gas Control System Response to Oxygen Setpoint

| Col. 1 | Col. 2 | Col. 3 | Col. 4 | Col. 5 | Col. 6 |
|---|---|---|---|---|---|
| Setpt vs 21% | Setpt vs sensor | Sensor vs 21% | System Action | Setpt | Example Initial Sensor Value |
| = | = | = | Idle | 21 | 21 |
| < or > | = | < or > | Idle | 10 | 10 |
| = | < or > | < or > | Purge | 21 | 10 |
| > | > | ≥ | $O_2$ Addition | 30 | 21 |
| > | > | < | Purge, then $O_2$ Addition | 30 | 10 |
| < | > | < | $O_2$ Addition | 15 | 10 |
| > | < | > | $O_2$ Depletion | 30 | 40 |
| < | < | ≤ | $O_2$ Depletion | 10 | 15 |
| < | < | > | Purge, then $O_2$ Depletion | 10 | 25 |

Gas Control System Response to Carbon Dioxide Setpoint

| Setpt vs sensor | System Action | Setpt | Example Initial Sensor Value |
|---|---|---|---|
| > | $CO_2$ Addition | 5 | 0 |
| < | Purge | 0 | 5 |
| = | Idle | 5 | 5 |

SYSTEM FOR MODIFYING THE ATMOSPHERE WITHIN AN ENCLOSED SPACE AND INCUBATOR SYSTEM INCLUDING THE SAME

CROSS-REFERENCE TO RELATED APPLICATIONS

The present application claims the benefit under 35 U.S.C. 119(e) of U.S. Provisional Patent Application No. 60/923, 296, filed Apr. 13, 2007, the disclosure of which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. 1 R43EB001511-01A1 and 1 R44EB001511-02 awarded by the National Institutes of Health.

BACKGROUND OF THE INVENTION

The present invention relates generally to systems for modifying the atmosphere within an enclosed space and relates more particularly to a new system for modifying the atmosphere within an enclosed space and to an incubator system including the same.

There are many different types of situations in which it may be desirable to provide an enclosed space having a controlled environment. One such example involves cell culture, particularly mammalian cell culture. Mammalian cell culture currently plays an important role in a number of areas of great interest including, but not limited to, basic medical research, transplantation, tissue engineering, stem cell production, vaccine production, antibody production and cellular assays. Mammalian cell culture is typically performed in an incubator, an enclosed chamber in which various environmental conditions, e.g., atmospheric composition, temperature, etc., are carefully controlled. Control over the composition of gases within an incubator is typically provided using gas supplied from one or more pressurized gas cylinders. For example, conventional incubators for mammalian cell culture are typically operated at 142 mm Hg (18.6%) oxygen and 38 mm Hg (5%) carbon dioxide. Such oxygen and carbon dioxide concentrations are typically achieved using pre-prepared $O_2/CO_2$ gas mixtures stored in pressurized gas cylinders.

However, as the role of oxygen concentration in cellular physiology becomes better understood, the need for adjustable oxygen concentrations for both research and production is becoming more apparent. For example, lower concentrations of oxygen are often required for research on stem cells, embryonic cells, and tumor cells; higher concentrations of oxygen may be advantageous for multilayer tissues, such as cultures of skin, pancreatic islets or tissue engineering products. Such diversity in the requirements for oxygen means that an adjustable concentration of incubator oxygen could enhance the research and production of many cell lines and primary cells. Some commercially-available low $O_2$-concentration incubator systems include a dual gas system, wherein one gas cylinder typically contains an $O_2/CO_2$ mixture and another gas cylinder typically contains $N_2$, the $N_2$ being used to achieve a desired low oxygen level by purging, i.e., supplanting some of the oxygen and carbon dioxide with nitrogen. Alternatively, there are "tri-gas" systems, in which $CO_2$, $O_2$, and $N_2$ are introduced from three different cylinders at varying ratios to provide adjustable oxygen and carbon dioxide levels.

Current commercially-available incubators using gas cylinders are capable of achieving the following environmental specifications: $CO_2$ ranges of 0-20%, $O_2$ ranges of 0-90%, relative humidity up to 95%, and temperature ranges of 5° C. above ambient to 60° C. above ambient. Special auxiliary equipment can provide temperatures below ambient. The recovery time (after opening the incubator) to regain these atmospheric set points can range from 8 minutes for $CO_2$ to 10 minutes for temperature and humidity recovery. The temperature of the incubator atmosphere can be controlled through the use of heat exchangers which can increase or decrease the temperature of the gas stream before it enters the incubator. Similarly, the humidity of the incubator atmosphere can be conditioned through the use of humidifiers and dehumidifiers, which can increase or decrease the humidity of the gas stream before it enters the incubator. The sizes and weights of these commercially available incubation systems are variable, with weights varying from 187 lbs to 490 lbs (excluding gas cylinders) and incubator spaces ranging from 5 $ft^3$ to 29 $ft^3$, respectively.

Unfortunately, the utilization of gas cylinders is cumbersome and inconvenient, in part, because of the size and the weight of the cylinders and, in many cases, because of the need for frequent cylinder changes. Gas cylinders can also be dangerous due to the possibility of uncontrolled release of the highly compressed gases contained within the cylinders. As a result, facilities using gas cylinders typically have to establish and to enforce safety rules on where gas cylinders can be stored and in what quantity, which loading docks and elevators can be utilized for the cylinders, which personnel can handle such gas cylinders, and the methods of securing the cylinders to walls. Also, where specialty gas mixtures are involved, the use of gas cylinders may result in a lag time between experiments, in the possibility of running out of a desired gas type, and in the expense involved in ordering specialty gas mixtures. Gas cylinders also run the risk of introducing chemical contaminants to an incubator due to previous gases stored in the cylinders and due to oils present in valves.

SUMMARY OF THE INVENTION

It is an object of the present invention to provide a new system for modifying the atmosphere within an enclosed space, said enclosed space being, for example, an incubation chamber of a cell culture incubator.

It is another object of the present invention to provide a system as described above that overcomes at least some of the shortcomings associated with existing methods and systems for controlling the atmosphere within an enclosed space.

It is still another object of the present invention to provide a system as described above that obviates the need for atmospheric gases to be provided to the enclosed space using pressurized gas cylinders.

According to one aspect of the invention, the concentration of gaseous oxygen within an enclosed space may be selectively increased or decreased using an electrochemical oxygen concentrator.

According to another aspect of the invention, the concentration of gaseous carbon dioxide within an enclosed space may be selectively increased using a direct alcohol fuel cell, a sodium bicarbonate electrolyzer, or a chemical oxidation of an alcohol solution.

According to still another aspect of the invention, the concentration of gaseous oxygen within an enclosed space may be selectively increased or decreased using an electrochemical oxygen concentrator, and the concentration of gaseous carbon dioxide within the same enclosed space may be selectively increased using a direct alcohol fuel cell, a sodium bicarbonate electrolyzer, or a chemical oxidizer of an alcohol solution.

One advantage of the present invention is that there is no need to have gas supplied from pressurized gas cylinders in order to control the concentration of atmospheric gases within an enclosed space. Instead, an integrated electrochemical device may be used, as desired, to increase or to decrease the oxygen concentration within the enclosed space, and an integrated electrochemical or chemical device may be used, as desired, to increase the carbon dioxide concentration within the enclosed space.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
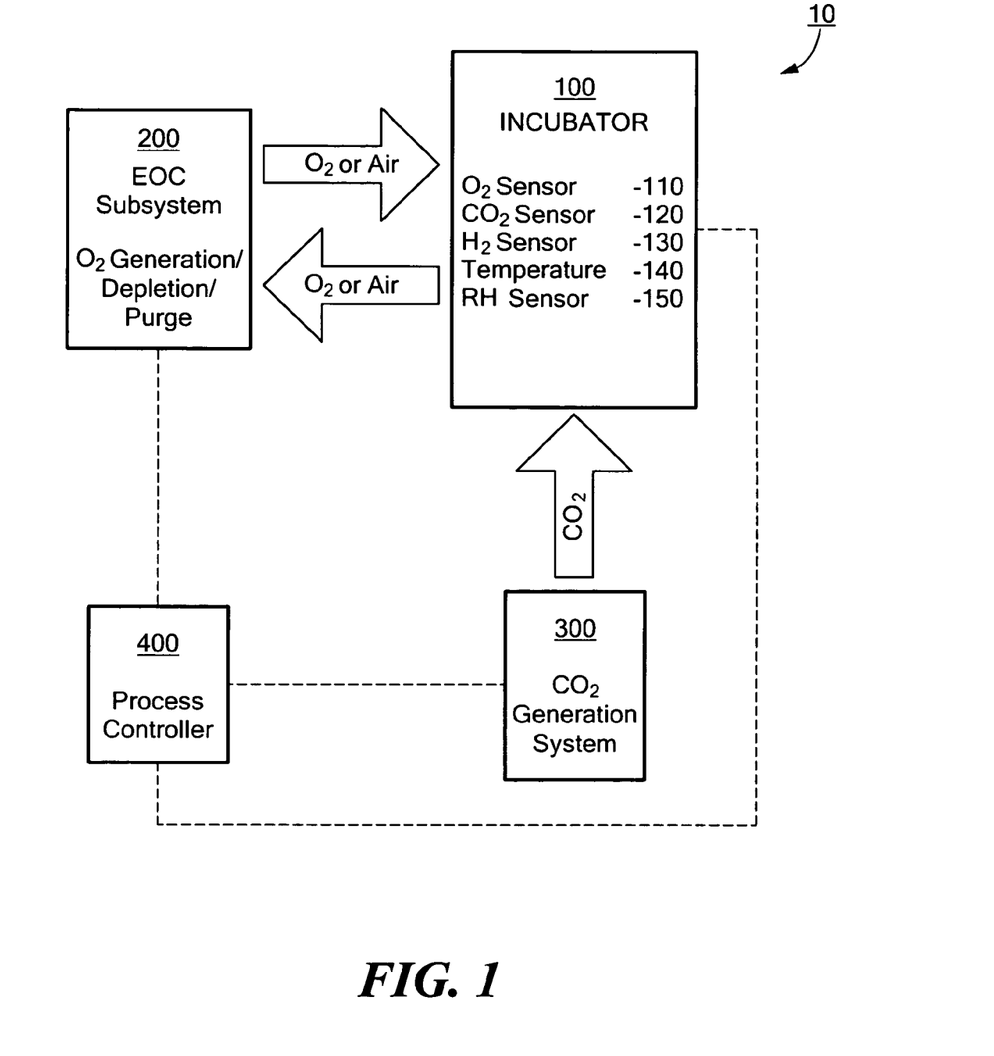
FIG. 1 is a block diagram of one embodiment of an incubator system incorporating the atmosphere control system of the present invention.

Referring now to FIG. 1, there is shown a block diagram of an incubator system incorporating the atmosphere control system of the present invention, the incubator system being represented generally by reference numeral 10.

System 10 comprises an incubator 100, an electrochemical oxygen concentrator (EOC) subsystem 200, a carbon dioxide generation subsystem 300, and a process controller 400. EOC subsystem 200, carbon dioxide generation subsystem 300, and process controller 400 collectively constitute an atmosphere control system. The atmosphere control system may be used to control the oxygen and carbon dioxide concentrations in the internal atmosphere of incubator 100. (If desired, the atmosphere control system may be modified to control only oxygen concentration by elimination of carbon dioxide generation subsystem 300 and appropriate modifications to process controller 400.)

Incubator 100 comprises an oxygen gas sensor 110 for use in measuring the concentration of oxygen gas present in the internal atmosphere of incubator 100, a carbon dioxide gas sensor 120 for use in measuring the concentration of carbon dioxide gas present in the internal atmosphere of incubator 100, and a hydrogen gas sensor 130 for use in measuring the concentration of hydrogen gas present in the internal atmosphere of incubator 100. In addition, incubator 100 further comprises a temperature sensor 140 for use in measuring the temperature of the internal atmosphere of incubator 100 and a humidity sensor 150 for use in measuring the relative humidity of the internal atmosphere of incubator 100. The aforementioned sensors may be included in a commercial incubator as standard features and/or may be retrofitted to a commercial incubator lacking such sensors. Although the aforementioned sensors are shown in the present embodiment as being part of incubator 100, one or more of these sensors may alternatively be located elsewhere in system 10, such as in a gas recirculation loop. Incubator 100 further comprises a user interface (not shown) for selecting an oxygen concentration setpoint and a carbon dioxide concentration setpoint. Instead of being included in incubator 100, the user interface may be a part of process controller 400.

Figure 2:
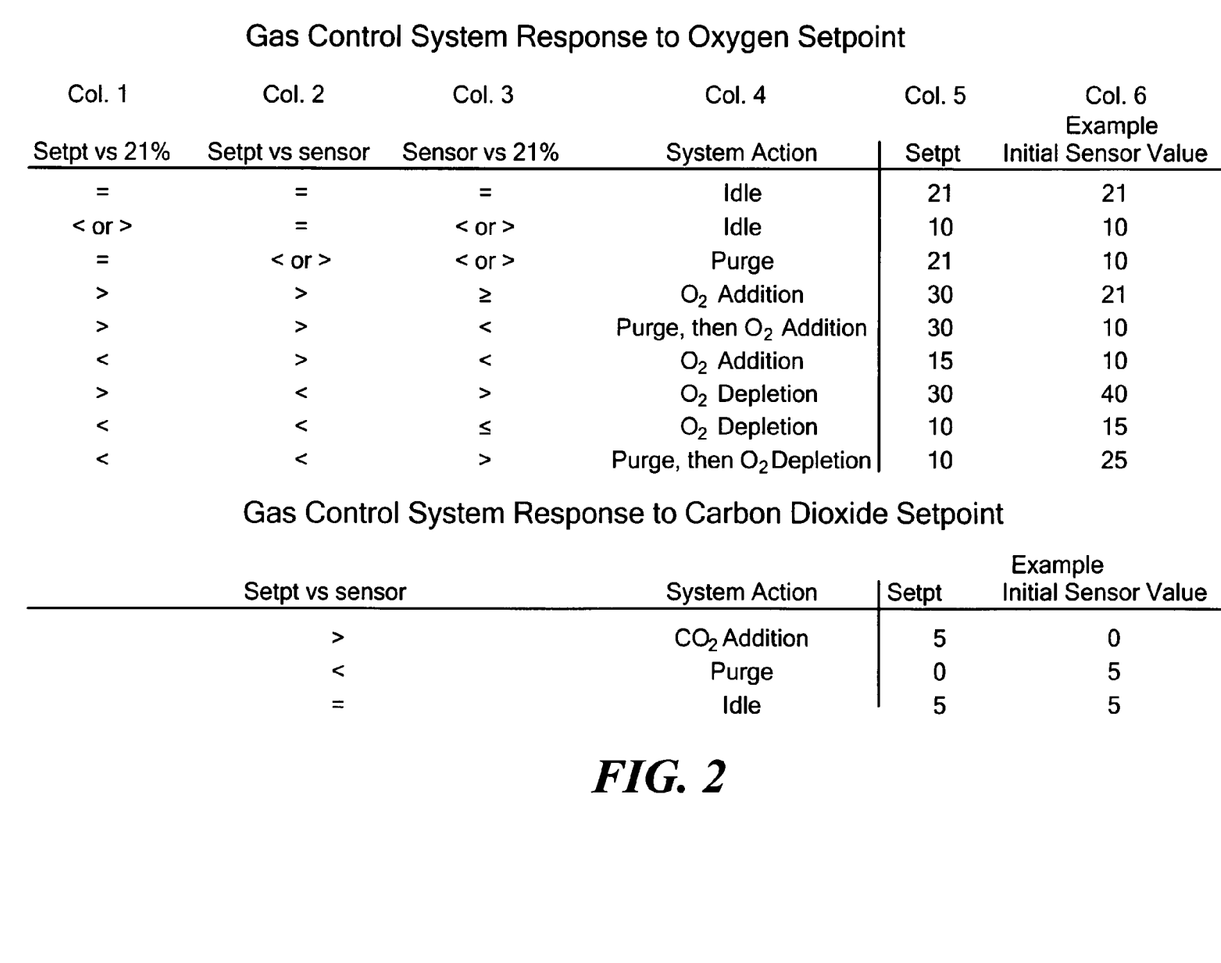
FIG. 2 is a table indicating the operating modes of the atmosphere control system of the present invention as a function of the user-setpoints and the oxygen and carbon dioxide concentrations in the incubator atmosphere.

To begin operation, the user selects the desired oxygen and carbon dioxide concentrations via the oxygen concentration setpoint and the carbon dioxide concentration setpoint. Next, process controller 400 compares the readings taken by oxygen concentration sensor 110 and carbon dioxide concentration sensor 120 with the selected setpoints. Next, assuming there is a differential between the readings and the setpoints, process controller 400: (1) initiates operation of EOC subsystem 200 in oxygen-addition or oxygen-depletion mode, and/or (2) initiates operation of the carbon dioxide subsystem 300, or (3) purges incubator 100 with ambient air using an air blower of EOC subsystem 200. When the setpoint conditions are satisfied, the atmosphere control system operates in idle mode, during which process controller 400 monitors the oxygen and carbon dioxide concentrations. The logic used to determine the operating mode of the atmosphere control system based on the user-setpoints and the detected oxygen and carbon dioxide concentrations is shown in the table of FIG. 2. The upper portion of the table of FIG. 2 describes the action of the atmosphere control system with respect to oxygen concentration. Col. 1 of the table shows whether the user-selected oxygen setpoint is greater than, equal to, or less than 21%—the nominal oxygen concentration in ambient air. Col. 2 shows whether the user-selected oxygen setpoint is greater than, equal to, or less than the reading of the incubator oxygen sensor 110. Similarly, Col. 3 compares the reading of the incubator oxygen sensor 110 to 21%. Col. 4 indicates the action of the atmosphere control system that occurs in accordance with the conditions of Col. 1, Col. 2 and Col. 3. Col. 5 and Col. 6 provide specific examples of oxygen concentration setpoints and oxygen sensor 110 readings that meet the criteria of Col. 1 through Col. 3 and that would result in the action listed in Col. 4. For example, in the fourth row down, the user has entered an oxygen setpoint of 30% and the incubator atmosphere, as measured by the oxygen concentration sensor 110, contains 21% oxygen. In this case, the atmosphere control system would activate EOC subsystem 200 in oxygen-addition mode. When the user-selected oxygen setpoint is greater than 21% oxygen and the incubator oxygen sensor reading is less than 21%, the incubator may first be purged with atmospheric air to increase the oxygen concentration to 21%. Then, EOC subsystem 200 may be activated in $O_2$-addition mode and operated until the oxygen setpoint is reached (Row 5). Similarly, when the user-selected oxygen setpoint is less than 21% oxygen and the incubator oxygen sensor reading is greater than 21%, the incubator may first be purged with atmospheric air to decrease the oxygen concentration to 21%. Then, EOC 200 may be activated in $O_2$-depletion mode until the setpoint is reached (Row 9). Purging incubator 100 as described above to achieve the oxygen setpoint is desirable since it enables the system to reach the setpoint more rapidly. However, it should be noted that such purging may be omitted, with EOC 200 being run either in an oxygen-addition or oxygen-depletion mode until such time that the setpoint is reached.

The logic used to control the action of the atmosphere control system with respect to carbon dioxide concentration is shown in the lower portion of the table of FIG. 2. As can be seen, if the user-selected carbon dioxide setpoint is greater than the reading of carbon dioxide sensor 120, carbon dioxide generation subsystem 300 is activated. If the user-selected carbon dioxide setpoint is lower than the reading of the carbon dioxide sensor 120, incubator 100 will be purged.

EOC subsystem 200 and carbon dioxide generator subsystem 300 are controlled independently by process controller 400. However, the purge mode takes precedence over oxygen addition and oxygen depletion by EOC subsystem 200 and over $CO_2$-addition by carbon dioxide generator subsystem 300. Thus, if the process logic requires purging of incubator 100 to meet the oxygen setpoint, incubator 100 will be purged, regardless of the carbon dioxide concentration. Similarly, if incubator 100 needs to be purged to meet the carbon dioxide setpoint, purging will occur, regardless of the oxygen concentration. During the purge mode, EOC subsystem 200 does not run in its oxygen-addition or oxygen-depletion modes, and carbon dioxide generator subsystem 300 does not run in its $CO_2$-addition mode.

Figure 3:
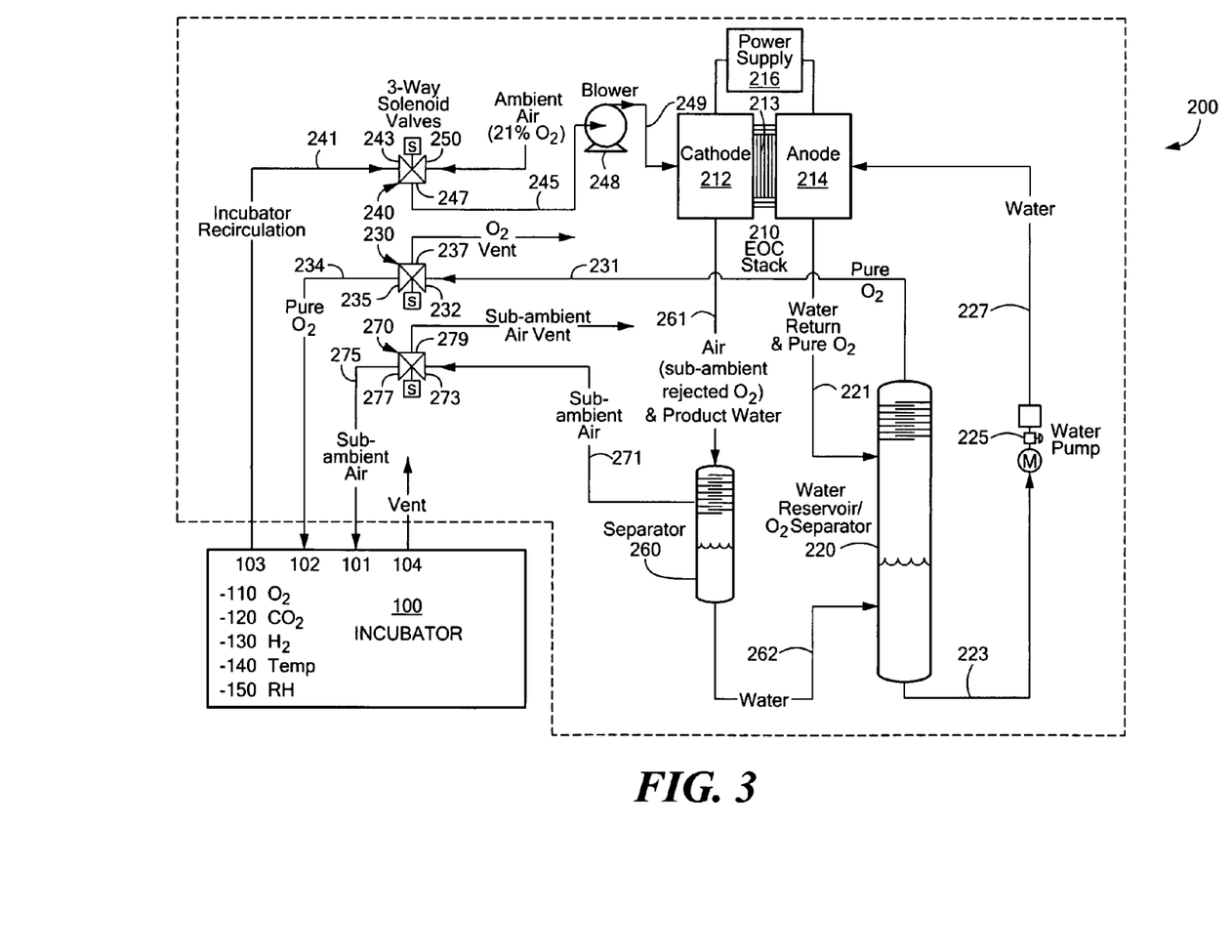
FIG. 3 is a schematic diagram of one embodiment of the electrochemical oxygen concentrator (EOC) subsystem shown in FIG. 1, the EOC subsystem being shown together with the incubator of FIG. 1.

Referring now to FIG. 3, additional details of EOC subsystem 200 are shown, EOC subsystem 200 being shown together with incubator 100.

EOC subsystem 200 comprises an EOC stack 210. Stack 210 may contain a single oxygen-transfer cell or a plurality of series-connected oxygen-transfer cells, each of said cells comprising a cathode 212 and an anode 214, the anode 212 and the cathode 214 of each cell being in intimate contact with and separated by an ionically-conductive separator 213. In a preferred embodiment, ionically-conductive separator 213 is a solid proton-exchange membrane (PEM), such as NAFION® 117 membrane (E.I. du Pont de Nemours & Company, Wilmington, Del.), anode 212 is a platinum/iridium particulate catalyst (50/50) with binder, applied as a decal to the solid PEM, and cathode 214 comprises a structural base of carbon paper as a porous carbon diffusion medium, onto which the side facing the PEM is sprayed platinum black particulate catalyst with binder. The opposite side of the carbon paper is preferably sprayed with TEFLON® polytetrafluoroethylene (PTFE) to provide wet proofing for the cathode. Anode 212 and cathode 214 are preferably in electrical contact with titanium bipolar plates (not shown) which have electrical leads to a power supply 216 and to process controller 400. Stack 210 preferably additionally includes support screens (not shown) and frames (not shown) for holding anode 212 and cathode 214 in physical and electrical contact.

EOC subsystem 200 additionally comprises a water reservoir/$O_2$ separator 220. A fluid line 221 is connected at one end to an outlet from anode 214 and at the opposite end to an inlet of reservoir/separator 220 to conduct water and pure $O_2$ from anode 214 to reservoir/separator 220. A fluid line 223 is connected at one end to an outlet located at the bottom of reservoir/separator 220 and at the opposite end to an inlet of a water pump 225 to conduct water from reservoir/separator 220 to water pump 225. A fluid line 227 is connected at one end to an outlet from water pump 225 and at the opposite end to an inlet of anode 214 to conduct water from water pump 225 to anode 214.

EOC subsystem 200 additionally comprises a first 3-way, electrically-activatable valve 230. Valve 230 may be, for example, a solenoid valve. A fluid line 231 is connected at one end to an outlet located at the top of reservoir/separator 220 and at the opposite end to a first port 232 of valve 230 to conduct pure $O_2$ from reservoir/separator 220 to valve 230. A fluid line 234 is connected at one end to a second port 235 of valve 230 and at the opposite end to an inlet 102 of incubator 100. Depending upon the operation of valve 230, pure $O_2$ may be conducted from valve 230 to incubator 100 or may be vented through a third port 237 of valve 230.

EOC subsystem 200 additionally comprises a second 3-way, electrically-activatable valve 240. Valve 240 may be, for example, a solenoid valve. A fluid line 241 is connected at one end to an outlet 103 from incubator 100 and at the opposite end to a first port 243 of valve 240 to conduct the atmosphere from incubator 100 to valve 240. A fluid line 245 is connected at one end to a second port 247 of valve 240 and at the opposite end to the inlet of a blower 248. A fluid line 249 connects the outlet of blower 248 to the inlet of cathode 212. Depending upon the operation of valve 240, blower 248 may receive the atmosphere from incubator 100 or may receive ambient air through a third port 250 of valve 240.

EOC subsystem 200 additionally comprises a separator 260. A fluid line 261 is connected at one end to an outlet of cathode 212 and at the opposite end to an inlet of separator 260 to conduct sub-ambient air (i.e., $O_2$-depleted air) and product water from cathode 212 to separator 260. A fluid line 262 is connected at one end to an outlet at the bottom of separator 260 and at the opposite end to an inlet of separator 220 to conduct water from separator 260 to separator 220.

EOC subsystem 200 additionally comprises a third 3-way, electrically-activatable valve 270. Valve 270 may be, for example, a solenoid valve. A fluid line 271 is connected at one end to an outlet from separator 260 and at the opposite end to a first port 273 of valve 270 to conduct the sub-ambient air from separator 260 to valve 270. A fluid line 275 is connected at one end to a second port 277 of valve 270 and at the opposite end to an inlet 101 of incubator 100. Depending upon the operation of valve 270, the sub-ambient air from separator 260 may be conducted to incubator 100 through line 275 or may be vented through a third port 279 of valve 270.

It should be understood that EOC subsystem 200 may be modified to include certain components to improve operation or to configure the system for certain applications. These components include, but are not limited to: air filters, water deionizers or purifiers, gas purifiers, heat exchangers, additional valves, pumps or blowers, and process sensors and alarms.

Additionally, it should be noted that, although FIG. 3 does not show the interactions between process controller 400 and EOC subsystem 200, process controller 400 controls all aspects of system operation, including, but not limited to: energizing/de-energizing solenoid valves, pump and blower speed, power supply voltage or current output, monitoring EOC stack and individual cell voltage, monitoring and alarming process variables, and automated shutdown in the event of a fault condition.

Operation of EOC Subsystem 200 During Oxygen Addition

When process controller 400 initiates operation of EOC subsystem 200 in oxygen-addition mode, water from water reservoir/$O_2$ separator 220 is pumped by pump 225 over the anode 214 of EOC stack 210. (An ion-exchange membrane or beads (not shown) may be positioned between pump 225 and anode 214 to ensure that the water fed to anode 214 is de-ionized water.) Simultaneously, ambient air is drawn through 3-way valve 240, flowing from port 250 to port 247, by air blower 248 and pumped across the cathode 212 of the EOC stack 210. Power is supplied at a controlled voltage or current to EOC stack 210 by direct current (dc) power supply 216 to effect the following electrochemical reactions:

(Anode): $H_2O \rightarrow \frac{1}{2}O_2 + 2H^+ + 2e^-$     EQN. 1

(Cathode): $\frac{1}{2}O_2$ (from ambient air) $+ 2H^+ + 2e^- \rightarrow H_2O$     EQN. 2

(Overall): $\frac{1}{2}O_2$ (from ambient air) $\rightarrow \frac{1}{2}O_2$     EQN. 3

The gaseous oxygen produced at the anode 214, together with any excess water, is conducted to the water reservoir/$O_2$ separator 220. Within reservoir/separator 220, the gaseous oxygen is separated from the water by gravity. The pure humidified gaseous oxygen then exits reservoir/separator 220 and flows through 3-way valve 230 from port 232 to port 235 and then to incubator 100 through port 102. To prevent over-pressurization of incubator 100, some of the incubator atmosphere is exhausted through a vent 104 as the pure oxygen is added to incubator 100.

The sub-ambient air leaving cathode 212, which air has an oxygen concentration lower than that of ambient air due to the reaction of some of its oxygen, is then separated by gravity from the product water in separator 260. The sub-ambient air then exits separator 260 and is vented from the system through 3-way valve 270 from port 273 through port 279. The product water within separator 260 is returned to the water reservoir/$O_2$ separator 220.

Operation of EOC subsystem 200 in the oxygen-addition mode may continue until the incubator oxygen concentration sensor 110 detects an oxygen concentration within a predetermined range, for example, within 0.5% of the user-selected oxygen concentration setpoint.

Operation of EOC Subsystem 200 During Oxygen Depletion

When process controller 400 initiates operation of EOC subsystem 200 in oxygen-depletion mode, atmosphere from incubator 100 is drawn through port 103 and through 3-way valve 240 from port 243 to 247, is drawn past air blower 248, and is pumped across the cathode 212 of EOC stack 210. Simultaneously, water from the water reservoir/$O_2$ separator 220 is pumped by pump 225 over anode 214 of EOC stack 210. Power is supplied at a controlled voltage or current to EOC stack 210 by dc power supply 216 to effect the electrochemical reactions shown in EQN. 1 and EQN. 2, except that, in the present case, the oxygen on the left-hand side of EQN. 2 is derived from the incubator atmosphere, as opposed to ambient air.

The air leaving cathode 212, which air has a decreased oxygen concentration following reaction of some of the oxygen, is separated from the product water in separator 260. The saturated sub-ambient then air flows through 3-way valve 270 from port 273 to 277 to incubator 100 through port 101. The product water collected in separator 260 is returned to the water reservoir/$O_2$ separator 220.

The oxygen produced at anode 214 is separated by gravity from the excess water in water reservoir/$O_2$ separator 220. The pure humidified oxygen is then vented from system 200 through 3-way valve 230 from port 232 to port 237.

Operation of EOC subsystem 200 in the oxygen-depletion mode may continue until the incubator oxygen concentration sensor 110 detects an oxygen concentration within a predetermined range, for example, within 0.5% of the user-selected oxygen concentration setpoint.

General Considerations of EOC Stack Voltage and Current

In both the oxygen-addition and oxygen-depletion modes, EOC stack 210 may be operated in either voltage control or current control mode. The dc power supply 216 may be instructed by process controller 400 to maintain a given voltage or current across EOC stack 210. Process controller 400 may vary the given voltage or current as the process requires. In a preferred embodiment, power supply 216 maintains a set voltage across EOC stack 210. The current of EOC stack 210 and, thus, the oxygen-generation or oxygen-depletion rate varies with the process conditions, primarily the temperature of EOC stack 210 and the oxygen concentration of the feed to cathode 212. The voltage of EOC stack 210 is set at a value that will prevent the entire stack from reaching the electrochemical potential at which hydrogen evolution on the cathode 212 will occur (i.e., the standard water electrolysis potential). For example, the operating voltage of a 10-cell EOC stack may be set at 12 V, an average of 1.2 V/cell, which is below the standard water electrolysis potential of 1.23 V.

To further minimize the possibility of hydrogen generation in EOC stack 210, process controller 400 may monitor the voltage of the individual cells in EOC stack 210 to ensure that an individual cell is not generating hydrogen, instead of reducing oxygen. If an individual cell voltage is higher than a predetermined value indicative of hydrogen evolution, for example 1.23 V, the current provided by power supply 216 to EOC stack 210 may be decreased or operation of EOC subsystem 200 may be automatically shut down. A hydrogen sensor 130 is included in incubator 100 as a further precaution. If hydrogen sensor 130 detects a hydrogen concentration greater than a predetermined low level, process controller 400 may be configured to shut down operation of EOC subsystem 200.

The current at a set voltage that can be sustained by EOC stack 210 during oxygen depletion decreases as the oxygen concentration in the incubator recirculation stream that feeds cathode 212 decreases. At sufficiently low oxygen concentrations, diffusion of oxygen to cathode 212 limits the current that can be drawn by the EOC stack 210. In one embodiment of the invention, this limiting current is used as a measurement of the oxygen concentration in the recirculating stream, either as a replacement for oxygen sensor 110 or as an additional measurement at low oxygen concentrations.

Operation of EOC Subsystem 200 During Purge Mode

When process controller 400 initiates a purge of incubator 100 to make the atmosphere inside incubator 100 more similar to the external ambient atmosphere, ambient air is drawn through 3-way valve 240 from port 250 to port 247 by air blower 248. This air is pumped through cathode 212 of EOC stack 210, which is not powered, through the separator 260, and through 3-way valve 270 from port 273 to port 277 into incubator 100 through port 101. The purge air replaces the atmosphere within incubator 100, which is vented through port 104. The purge may continue until the incubator oxygen concentration sensor 110 detects an oxygen concentration within a predetermined range, for example, 0.5% of the oxygen concentration in ambient air, namely, 21%. Purge mode for achieving a desired oxygen concentration is optional but is preferable since it enables the system to reach its setpoint more rapidly. (Purge mode may also be used to adjust the carbon dioxide concentration within incubator 100.)

Figure 4:
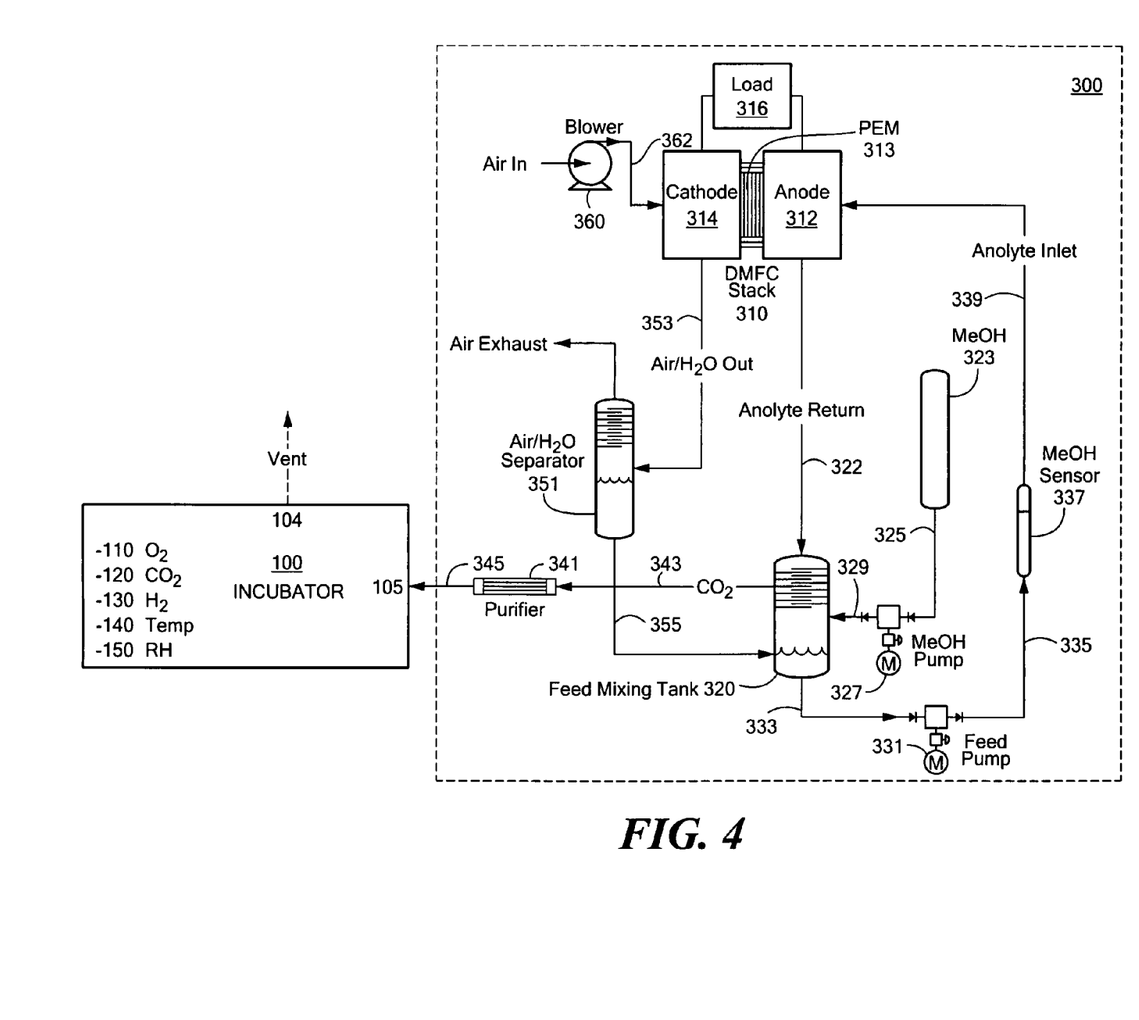
FIG. 4 is a schematic diagram of a first embodiment of the carbon dioxide generation subsystem shown in FIG. 1, the carbon dioxide generation subsystem being shown together with the incubator of FIG. 1.

Referring now to FIG. 4, additional details of carbon dioxide generation subsystem 300 are shown, carbon dioxide generation subsystem 300 being shown together with incubator 100.

Subsystem 300 comprises a direct alcohol fuel cell stack 310, which in the present embodiment is preferably a direct methanol fuel cell (DMFC) stack. Stack 310 may contain a single cell or a plurality of series-connected cells, each cell comprising an anode 312 and a cathode 314 in intimate contact with and separated by an ionically-conductive separator 313. In a preferred embodiment, the ionically-conductive separator comprises a proton-exchange membrane 313. Anode 312 and cathode 314 are electrically coupled to a load 316 and to process controller 400.

Subsystem 300 additionally comprises a feed mixing tank 320. A fluid line 322 is connected at one end to an outlet of anode 312 and at an opposite end to an inlet of tank 320 to conduct anolyte from anode 312 to mixing tank 320.

Subsystem 300 additionally comprises a methanol tank 323. A fluid line 325 is connected at one end to an outlet of tank 323 and at an opposite end to an inlet of a methanol pump 327. A fluid line 329 is connected at one end to an outlet of pump 327 and at an opposite end to an inlet of mixing tank 320. In this manner, methanol may be pumped from tank 323 into mixing tank 320.

Subsystem 300 additionally comprises a feed pump 331. A fluid line 333 is connected at one end to an outlet at the bottom of mixing tank 320 and at the opposite end to an inlet of feed pump 331. A fluid line 335 is connected at one end to an outlet of feed pump 331 and at the opposite end to an inlet of a methanol sensor 337. A fluid line 339 is connected at one end to an outlet of sensor 337 and at the opposite end to an inlet of anode 312. In this manner, methanol may be pumped, as needed, from mixing tank 320 to anode 312.

Subsystem 300 additionally comprises a $CO_2$ purifier 341. A fluid line 343 is connected at one end to an outlet of feed mixing tank 320 and at the opposite end to an inlet of purifier 341. A fluid line 345 is connected at one end to an outlet of purifier 341 and at the opposite end to a carbon dioxide inlet port 105 in incubator 100.

Subsystem 300 additionally comprises an air/water separator 351. A fluid line 353 is connected at one end to an outlet of cathode 314 and at the opposite end to an inlet of separator 351. A fluid line 355 is connected at one end to an outlet at the bottom of separator 351 and at the opposite end to an inlet of mixing tank 320 to conduct water to tank 320. An outlet is provided at the top of separator 351 to permit air to be exhausted from separator 351.

Subsystem 300 additionally comprises a blower 360. A fluid line 362 is connected at one end to blower 360 and at the opposite end to the inlet of cathode 314 so that air may be supplied to cathode 314 by blower 360.

It should be understood that subsystem 300 may be modified to include certain components to improve operation or to configure the system for certain applications. These components include, but are not limited to: air filters, water deionizers or purifiers, heat exchangers, additional valves, pumps or blowers, and process sensors and alarms.

Additionally, it should be noted that, although FIG. 4 does not show the interactions between process controller 400 and subsystem 300, process controller 400 controls all aspects of system operation, including, but not limited to: energizing/de-energizing solenoid valves, controlling pump and blower speed, controlling load voltage or current settings, monitoring DMFC stack and individual cell voltages, monitoring and alarming process variables, and automated shutdown in event of a fault condition. Furthermore, it should be noted that stack 310 may be scaled up to provide sufficient electricity to power some or all of EOC subsystem 200, as well as other components of system 10.

In use, when process controller 400 initiates operation of subsystem 300, ambient air is supplied by blower 360 to cathode 314 of stack 310. Simultaneously, a dilute aqueous methanol solution (anolyte) having a methanol concentration in the range of 0.25 M to 3 M, preferably in the concentration range of 0.5 M to 1.5 M, is pumped from feed mixing tank 320 across anode 312 by feed pump 331. A load 316 having a controlled current and/or voltage is placed across stack 310, resulting in the reactions shown below in EQN. 4 through EQN. 6.

$$\text{(Anode): } CH_3OH + H_2O \rightarrow CO_2 + 6H^+ + 6e^- \quad \text{EQN. 4}$$

$$\text{(Cathode): } 3/2O_2 + 6H^+ + 6e^- \rightarrow 3H_2O \quad \text{EQN. 5}$$

$$\text{(Overall): } CH_3OH + 3/2O_2 \rightarrow 2H_2O + CO_2 \quad \text{EQN. 6}$$

The effluent from anode 312, which contains gaseous and/or dissolved carbon dioxide, as well as water and unreacted methanol, is returned to mixing tank 320. The gaseous carbon dioxide is separated from the methanol solution in tank 320 by gravity and is then treated in purifier 341 to remove any methanol liquid or vapor present in the stream. The purified carbon dioxide gas then flows to incubator 100 through port 105. To prevent over-pressurization of incubator 100, some of the atmosphere from incubator 100 is exhausted through vent 104 as carbon dioxide is added to incubator 100.

Methanol fuel is stored in tank 323. Tank 323 may be a refillable container or a pre-filled cartridge containing neat (pure) methanol or a methanol-water solution that is more concentrated than the solution in mixing tank 320. For example, a 24 volume percent methanol solution may be used as the fuel to minimize flammability concerns of methanol fuel.

The methanol concentration of the anode feed solution may be measured by methanol concentration sensor 337. When sensor 337 detects a methanol concentration below a predetermined value, process controller 400 energizes methanol pump 327 to dispense methanol fuel from tank 323 into mixing tank 320. Addition of methanol fuel may continue until a predetermined methanol concentration is obtained, as measured by sensor 337.

The effluent from cathode 314 contains sub-ambient air, product water, and water that came across separator 313 from anode 312. This effluent stream flows to an air/water separator 351. The sub-ambient air in separator 351 is vented from the system while the water is returned to mixing tank 320.

Operation of subsystem 300 may continue until carbon dioxide concentration sensor 120 detects a carbon dioxide concentration within a predetermined range, for example, within 0.5% of the user-selected carbon dioxide concentration setpoint.

Figure 5:
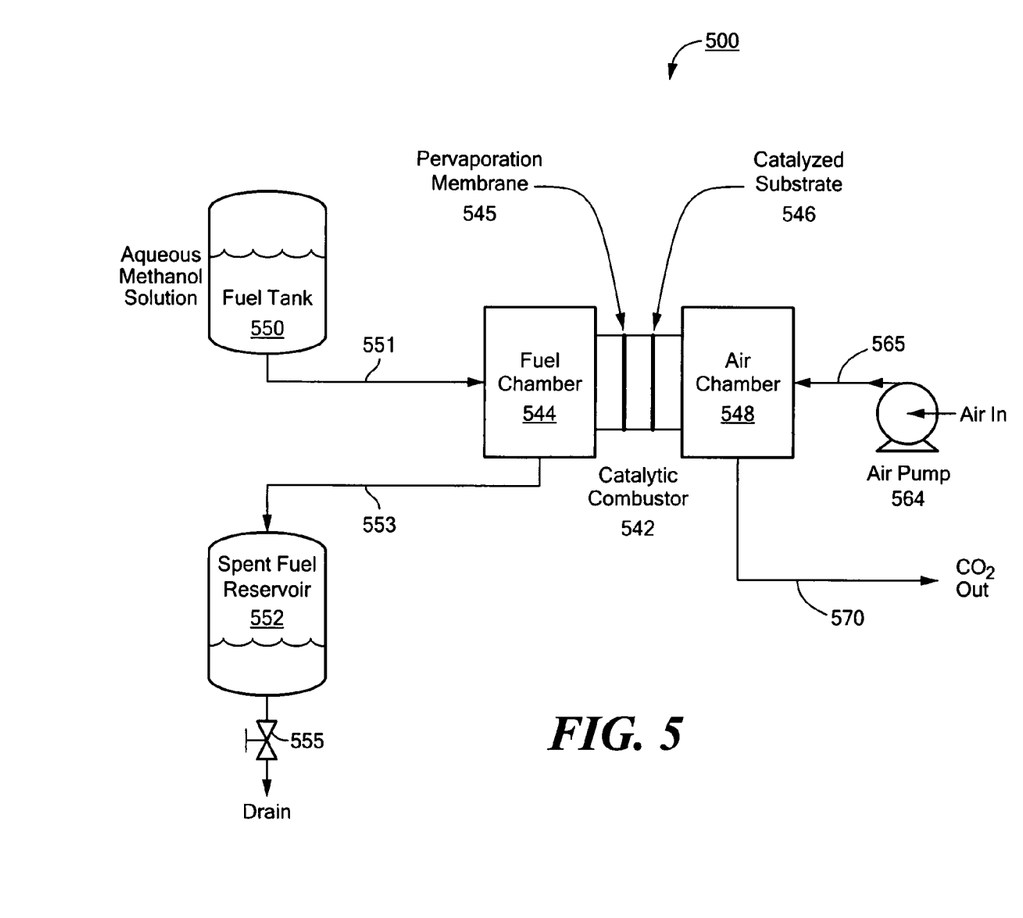
FIG. 5 is a schematic diagram of an alternate embodiment of a carbon dioxide generation subsystem suitable for use in the incubator system of FIG. 1.

Referring now to FIG. 5, there is shown a schematic diagram of an alternate embodiment of a carbon dioxide generation subsystem suitable for use in incubator system 10, the alternate carbon dioxide generation subsystem being usable in place of carbon dioxide generation subsystem 300, said alternate carbon dioxide generation subsystem being represented generally by reference numeral 500.

Subsystem 500 generates carbon dioxide by the catalytic combustion of an alcohol fuel, which, in the present embodiment, is methanol. Subsystem 500 comprises a catalytic combustor 542, which may be a single cell or a plurality of cells, each cell containing a fuel chamber 544, a pervaporation membrane 545, a catalyzed substrate 546, and an air chamber 548.

Subsystem 500 additionally comprises a fuel tank 550, fuel tank 550 containing a volume of an aqueous methanol solution. A fluid line 551 is connected at one end to an outlet of fuel tank 550 and at the opposite end to an inlet of fuel chamber 544.

Subsystem 500 additionally comprises a spent fuel reservoir 552. A fluid line 553 is connected at one end to an outlet of fuel chamber 544 and at the opposite end to an inlet of reservoir 552. A valve 555 may be connected to an outlet of reservoir 552 to drain reservoir 552.

Subsystem 500 additionally comprises an air pump 564. A fluid line 565 is connected at one end to the output of air pump 564 and at the opposite end to an inlet of air chamber 548. A fluid line 570 is connected at an outlet of air chamber 548 to convey carbon dioxide.

It should be understood that subsystem 500 may be modified to include certain components to improve operation or to configure the system for certain applications. These components include, but are not limited to: air filters, water deionizers or purifiers, gas purifiers, heat exchangers, additional valves, pumps or blowers, and process sensors and alarms.

Additionally, it should be noted that, although FIG. 5 does not show the interactions between process controller 400 and subsystem 500, process controller 400 controls all aspects of the operation of subsystem 500.

In operation, methanol or a methanol solution is supplied from fuel tank 550 to fuel chamber 544 of the catalytic combustor 542. In a preferred embodiment, the fuel is an aqueous methanol solution containing from 4 vol % to 50 vol % methanol. The fuel solution may flow by gravity or a pump may be used. Fuel chamber 544 contains flow channels or passages for the fuel solution. One side of fuel chamber 544 houses pervaporation membrane 545, which has a high permeability for methanol vapor but does not pass liquid methanol. The methanol in the solution pervaporates to the opposite side of membrane 545, which is adjacent to catalyzed substrate 546 containing a high surface area noble metal catalyst, such as platinum. The catalyst is treated or structured to provide hydrophobic channels to allow air access to the catalyst sites. Catalyzed substrate 546 is positioned on one side of air chamber 548. Ambient air is supplied to air chamber 548 by air pump 564. Oxygen in the air reacts with methanol on catalyzed substrate 546 to form carbon dioxide according to EQN. 7.

$$CH_3OH + 3/2 O_2 \rightarrow CO_2 + 2H_2O \quad \text{EQN. 7}$$

The effluent from air chamber 548 contains up to 14 vol % carbon dioxide in a subambient air stream. This stream may then be supplied to incubator 100 using line 570. The spent methanol fuel leaving fuel chamber 544 is collected in spent fuel reservoir 552. Although not shown in the present embodiment, the spent methanol fuel may be recirculated from reservoir 552 to fuel tank 550.

Figure 6:
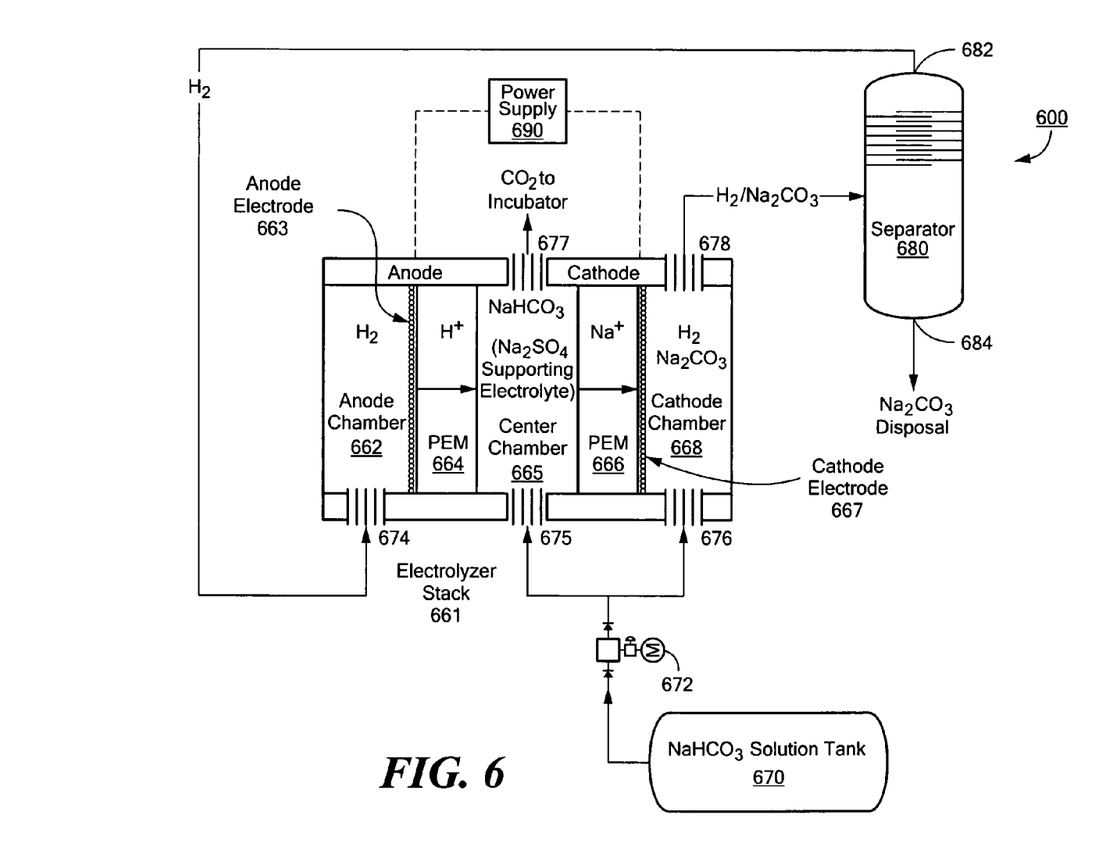
FIG. 6 is a schematic diagram of a further alternate embodiment of a carbon dioxide generation subsystem suitable for use in the incubator system of FIG. 1.

Referring now to FIG. 6, there is shown a schematic diagram of a further alternate embodiment of a carbon dioxide generation subsystem suitable for use in incubator system 10, the alternate carbon dioxide generation subsystem being usable in place of carbon dioxide generation subsystem 300, said alternate carbon dioxide generation subsystem being represented generally by reference numeral 600.

Subsystem 600, which is based on the electrolysis of an aqueous sodium bicarbonate solution, comprises a sodium bicarbonate electrolyzer stack 661. Stack 661 comprises a single cell or a plurality of cells connected in series or parallel. Each cell is divided into three chambers, an anode chamber 662, a center chamber 665, and a cathode chamber 668. An anode electrode 663 containing Pt catalyst is in intimate contact with a perfluorocarbon proton-exchange membrane (PEM) 664 in the sulfonic acid form. Membrane 664 separates anode chamber 662 from center chamber 665. A second PEM 666 separates center chamber 665 from cathode chamber 668. PEM 666 may be in the sulfonic acid form, or more preferably, in the carboxylic acid form. A cathode electrode 667 containing Pt catalyst is in intimate contact with PEM 666.

In operation, hydrogen gas produced at cathode 667 is re-circulated to anode chamber 662 through a port 674. The hydrogen is oxidized on anode electrode 663 to form $H^+$ ions and electrons. The $H^+$ ions are transported through PEM 664 to center chamber 665. Center chamber 665 contains an aqueous saturated bicarbonate solution, which is supplied from a tank 670 by a pump 672 through a port 675. Sodium sulfate may be added to the sodium bicarbonate solution to serve as a supporting electrolyte. In center chamber 665, the $H^+$ ions chemically react with the sodium bicarbonate to form carbon dioxide, water and sodium ions ($Na^+$). The carbon dioxide is vented through a port 677 and is supplied to incubator 100. Simultaneous with the $H^+$ ion transport, the $Na^+$ ions generated in center chamber 665 are transported through second PEM 666 to cathode chamber 668. Sodium bicarbonate solution is also supplied to cathode chamber 668 from tank 670 by pump 672 through a port 676. Water from the sodium bicarbonate solution is electrochemically reduced at cathode electrode 667 to form $OH^-$ ion and hydrogen gas. The OH- combines with the transported $Na^+$ ions to form sodium hydroxide (NaOH). The NaOH reacts with the sodium bicarbonate in cathode chamber 667 to form sodium carbonate ($Na_2CO_3$). The sodium carbonate solution, mixed with hydrogen gas, flows from cathode compartment 668 through a port 678 to a separator 680. Hydrogen is released from separator 680 through a port 682 and is re-circulated to anode chamber 662. The sodium carbonate flows from separator 680 through a port 684 and is collected for disposal.

Power for the electrolyzer is provided by a power supply 690. The voltage per cell is approximately 1.0 V. This voltage is lower than that of a standard water electrolyzer because the hydrogen re-circulated from the cathode to the anode depolarizes the anode, resulting in the hydrogen oxidation reaction, rather than the oxygen evolution reaction at the anode and, thus, a lower cell voltage. The reactions occurring in subsystem 600 are as follows:

$$\text{(Anode): } H_2 \rightarrow 2H^+ + 2e^- \quad \text{EQN. 8}$$

$$\text{(Chemical—Center Chamber): } 2H^+ + 2NaHCO_3 \rightarrow 2H_2O + 2CO_2 + 2Na^+ \quad \text{EQN. 9}$$

$$\text{(Cathode): } 2H_2O + 2e^- \rightarrow H_2 + 2OH^- \quad \text{EQN. 10}$$

$$\text{(Chemical—Anode Chamber): } 2NaOH + 2NaHCO_3 \rightarrow 2Na_2CO_3 + 2H_2O \quad \text{EQN. 11}$$

$$\text{(Overall): } 4NaHCO_3 \rightarrow 2Na_2CO_3 + 2H_2O + 2CO_2 \quad \text{EQN. 12}$$

It should be understood that subsystem 600 may be modified to include certain components to improve operation or to configure the system for certain applications. These components include, but are not limited to: filters, heat exchangers, additional valves, pumps or blowers, and process sensors and alarms.

Additionally, it should be noted that, although FIG. 6 does not show the interactions between process controller 400 and subsystem 600, process controller 400 controls all aspects of the operation of subsystem 600.

The following examples are illustrative only and do not limit the present invention.

Example 1

An actual embodiment of system 10 was constructed. In this embodiment, EOC subsystem 200 included a 5-cell stack with an active cell area of 50 cm$^2$/cell that was operated at a maximum current density of 100 mA/sq. cm. EOC subsystem 200 generated a maximum of 83 cm$^3$/min of pure $O_2$ when in oxygen generation mode. When in oxygen removal mode, EOC subsystem 200 generated a gas stream of <1% oxygen. Subsystem 300 included a 5-cell DMFC stack with an active area of 80 sq. cm./cell that was operated at current densities between 110-150 mA/sq. cm. Subsystem 300 generated 154 cm$^3$/min of $CO_2$.

Example 2

The system of Example 1 was operated at current densities up to ~100 mA/cm$^2$ using a 5-V, 5.0-amp variable power supply. At this current density, EOC subsystem 200 produced oxygen at the rate of 83 cm$^3$/min and changed the concentration of oxygen in a 1-ft$^3$ incubator by 20 volume percent in a period of approximately 2 hours.

Example 3

In another embodiment, a small on-board $CO_2$ control subsystem consisting of a 5-cell DMFC with a maximum power output of 12 watts could be integrated into the completed incubator and EOC subsystems. A larger DMFC unit (150 Watt DC-output, inverted to 120 VAC) could be utilized to provide power to the EOC subsystem as well as to power auxiliaries (electronics, blowers, valves, sensors). The integrated incubator system can operate directly from DMFC power by attaching the 150-W DMFC unit, or the integrated system can operate from 120-VAC grid power and still produce $CO_2$ with the small on-board $CO_2$ subsystem.

Example 4

The following are certain specifications for an embodiment of system 10 actually reduced to practice:

| Gas Generation Unit Integrated Specs | |
|---|---|
| Power Requirements | 60 W (120 VAC, 0.5 A) - Max/15 W - Idle |
| Integrated System Weight | 87 lb (39.4 kg) |
| Gas Generation/Control Weight | 30 lb (13.2 kg) |
| Incubator Volume | 1 ft$^3$ (28 L) |
| EOC | 5-cell, 50 cm$^2$/cell |
| DMFC | 5-cell, 80 cm$^2$/cell |
| $O_2$ | Concentration: 1-60% atmosphere: Rate: 83 cm$^3$/min (Max) |
| $CO_2$ | Concentration: 0-5% atmosphere: Rate: 154 cm$^3$/min (Max) |
| Reservoir Capacity (Water) | ~500 mL |
| Reservoir Capacity (Methanol) | ~250 mL |

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for modifying the atmosphere within an enclosed space, said system comprising:
   (a) a first electrochemical device, said first electrochemical device comprising a solid polymer electrolyte, an anode coupled to a face of said solid polymer electrolyte, and a cathode coupled to an opposing face of said solid polymer electrolyte;
   (b) means for supplying water to said anode;
   (c) means for supplying an oxygen-containing fluid to said cathode, said oxygen-containing fluid being selectively drawn from either the enclosed space or the ambient atmosphere;
   (d) a power supply for applying a controlled voltage or current to the first electrochemical device to cause said anode to evolve oxygen from water to yield an oxygen-enriched fluid and to cause said cathode to consume oxygen from the oxygen-containing fluid to yield an oxygen-depleted fluid;
   (e) means for monitoring oxygen concentration within the enclosed space; and
   (f) means, responsive to the monitored oxygen concentration within the enclosed space and an oxygen concentration set point, for selectively conducting either the oxygen-enriched fluid or the oxygen-depleted fluid to the enclosed space for use in reaching the oxygen concentration set point.

2. The system as claimed in claim 1 further comprising means for selectively generating and supplying carbon dioxide gas to the enclosed space.

3. The system as claimed in claim 2 wherein said carbon dioxide generation and supply means comprises a second electrochemical device, said second electrochemical device being configured to generate carbon dioxide.

4. The system as claimed in claim 3 wherein said second electrochemical device comprises a direct alcohol fuel cell.

5. The system as claimed in claim 4 wherein the direct alcohol fuel cell is used to provide at least some of the power to the first electrochemical device.

6. The system as claimed in claim 3 wherein said second electrochemical device comprises an aqueous sodium bicarbonate electrolyzer.

7. The system as claimed in claim 2 wherein said carbon dioxide generation and supply means comprises a catalytic combustion device of an alcohol fuel.

8. The system as claimed in claim 1 further comprising means for monitoring the cell voltage of each cell in the first electrochemical device to ensure that cell voltage remains below a pre-selected cell voltage limit and means for adjusting current applied to each cell of the first electrochemical device accordingly to avoid exceeding a cell voltage limit.

9. An incubator system comprising:
(a) an incubator, the incubator comprising an incubation chamber;
(b) means for monitoring oxygen concentration within the incubation chamber; and
(c) electrochemical means, coupled to the incubator and responsive to the monitored oxygen concentration within the incubation chamber and an oxygen concentration set point, for selectively increasing or decreasing the concentration of oxygen within the incubation chamber for use in reaching the oxygen concentration set point, wherein said electrochemical means comprises an electrochemical device comprising a solid polymer electrolyte, an anode coupled to a face of said solid polymer electrolyte, and a cathode coupled to an opposing face of said solid polymer electrolyte.

10. An incubator system comprising:
(a) an incubator, the incubator comprising an incubation chamber;
(b) means for monitoring oxygen concentration within the incubation chamber; and
(c) electrochemical means, coupled to the incubator and responsive to the monitored oxygen concentration within the incubation chamber and an oxygen concentration set point, for selectively increasing or decreasing the concentration of oxygen within the incubation chamber for use in reaching the oxygen concentration set point, wherein the electrochemical means comprises
  i. a first electrochemical device, said first electrochemical device comprising a solid polymer electrolyte, an anode coupled to a face of said solid polymer electrolyte, and a cathode coupled to an opposing face of said solid polymer electrolyte;
  ii. means for supplying water to said anode;
  iii. means for supplying an oxygen-containing fluid to said cathode, said oxygen-containing fluid being selectively drawn from either the enclosed space or the ambient atmosphere;
  iv. a power supply for applying a controlled voltage or current to the first electrochemical device to cause said anode to evolve oxygen from water to yield an oxygen-enriched fluid and to cause said cathode to consume oxygen from the oxygen-containing fluid to yield an oxygen-depleted fluid; and
  v. means for selectively conducting either the oxygen-enriched fluid or the oxygen-depleted fluid to the incubation chamber.

11. The incubator system as claimed in claim 9 further comprising means coupled to the incubator for selectively increasing the concentration of carbon dioxide within the incubation chamber.

12. The incubator system as claimed in claim 11 wherein said carbon dioxide increasing means comprises an electrochemical device configured to generate carbon dioxide.

13. The incubator system as claimed in claim 12 wherein said electrochemical device comprises a direct alcohol fuel cell.

14. The incubator system as claimed in claim 11 wherein said electrochemical device comprises an aqueous sodium bicarbonate electrolyzer.

15. The incubator system as claimed in claim 11 wherein said carbon dioxide increasing means comprises a catalytic combustor of an alcohol fuel.

16. The incubator system as claimed in claim 9 further comprising a controller for controlling the operation of the electrochemical means.

17. An incubator system comprising:
an incubator, the incubator comprising an incubation chamber, the incubation chamber having an internal atmosphere;
an oxygen gas sensor for detecting the oxygen concentration of the internal atmosphere of the incubation chamber;
a carbon dioxide gas sensor for detecting the carbon dioxide concentration of the internal atmosphere of the incubation chamber; and
an atmosphere control system for controlling the oxygen concentration and the carbon dioxide concentration of the internal atmosphere of the incubation chamber, the atmosphere control system comprising
  an electrochemical oxygen concentrator subsystem, the electrochemical oxygen concentrator subsystem being fluidly coupled to the incubation chamber to selectively conduct to the incubation chamber either an oxygen-enriched fluid or an oxygen-depleted fluid,
  a carbon dioxide generation subsystem, the carbon dioxide generation subsystem being fluidly coupled to the incubation chamber to selectively conduct to the incubation chamber a carbon dioxide-enriched fluid, and
  means, fluidly coupled to the incubation chamber, for replacing at least some of the internal atmosphere of the incubation chamber with ambient air; and
  a process controller for controlling operation of the electrochemical oxygen concentrator subsystem, the carbon dioxide generation subsystem, and the atmosphere replacing means based on oxygen and carbon dioxide concentration set points and the detected oxygen and carbon dioxide concentrations within the incubation chamber.

18. The incubator system as claimed in claim 17 wherein the electrochemical oxygen concentrator subsystem comprises a first electrochemical device and the carbon dioxide generation subsystem comprises a second electrochemical device.

19. The incubator system as claimed in claim 18 wherein the second electrochemical device is a direct alcohol fuel cell.

20. The incubator system as claimed in claim 18 wherein the second electrochemical device comprises an aqueous sodium bicarbonate electrolyzer.

21. The incubator system as claimed in claim 17 wherein the carbon dioxide generation subsystem comprises a catalytic combustion device of an alcohol fuel.

22. The system as claimed in claim 1 further comprising means for monitoring carbon dioxide concentration within the enclosed space and means, responsive to the monitored carbon dioxide concentration within the enclosed space and a carbon dioxide set point, for selectively increasing or decreasing the carbon dioxide concentration within the enclosed space.

23. The system as claimed in claim 22 wherein said means for selectively increasing or decreasing the carbon dioxide concentration within the enclosed space comprises a device for generating and supplying carbon dioxide to the enclosed space and means for replacing at least some of the atmosphere of the enclosed space with ambient air.

24. The system as claimed in claim 10 further comprising means for monitoring carbon dioxide concentration within the incubation chamber and means, responsive to the monitored carbon dioxide concentration within the incubation chamber and a carbon dioxide set point, for selectively increasing or decreasing the carbon dioxide concentration within the incubation chamber.

* * * * *